US011996617B2

(12) United States Patent
Wayton et al.

(10) Patent No.: US 11,996,617 B2
(45) Date of Patent: May 28, 2024

(54) TOROIDAL GRADIENT INDEX LENS FOR OMNI AND SECTOR ANTENNAS

(71) Applicant: JOHN MEZZALINGUA ASSOCIATES, LLC, Liverpool, NY (US)

(72) Inventors: Evan Wayton, Tully, NY (US); Lance Bamford, Pittsford, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 124 days.

(21) Appl. No.: 17/620,263

(22) PCT Filed: Sep. 26, 2019

(86) PCT No.: PCT/US2019/053114
§ 371 (c)(1),
(2) Date: Dec. 17, 2021

(87) PCT Pub. No.: WO2020/256760
PCT Pub. Date: Dec. 24, 2020

(65) Prior Publication Data

US 2022/0344828 A1 Oct. 27, 2022

Related U.S. Application Data

(60) Provisional application No. 62/863,529, filed on Jun. 19, 2019.

(51) Int. Cl.
*H01Q 19/06* (2006.01)
*H01Q 3/14* (2006.01)
(Continued)

(52) U.S. Cl.
CPC ............... *H01Q 19/06* (2013.01); *H01Q 3/14* (2013.01); *H01Q 3/446* (2013.01); *H01Q 15/08* (2013.01); *H01Q 21/205* (2013.01)

(58) Field of Classification Search
CPC .......... H01Q 3/14; H01Q 3/446; H01Q 15/08; H01Q 19/06; H01Q 21/205
See application file for complete search history.

(56) References Cited

U.S. PATENT DOCUMENTS

| | | | | |
|---|---|---|---|---|
| 3,255,453 A * | 6/1966 | Horst | H01Q 15/08 343/754 |
| 2005/0122276 A1 * | 6/2005 | Louzir | H01Q 19/062 343/770 |

(Continued)

OTHER PUBLICATIONS

International Search Report and Written Opinion dated Mar. 31, 2020, from International Application No. PCT/US2019/053114, 10 pages.

(Continued)

*Primary Examiner* — Robert Karacsony
(74) *Attorney, Agent, or Firm* — Meunier Carlin & Curfman LLC

(57) ABSTRACT

Disclosed is an antenna having a toroidal gradient index lens, whereby a radiator may be disposed within the inner hole of the toroid. The antenna may include a mechanism that translates the radiator along the z-axis whereby an "upward" translation of the radiator along the z-axis tilts the antenna's elevation beam pattern downward. The radiator disposed within the hole of the toroid lens may be a dipole or a multi-sector radiator, such as a tri-sector radiator. Disclosed are two variations of the toroidal lens: a toroid shape, and a cylindrical toroidal shape.

10 Claims, 8 Drawing Sheets

(51) Int. Cl.

| | |
|---|---|
| ***H01Q 3/44*** | (2006.01) |
| ***H01Q 15/08*** | (2006.01) |
| ***H01Q 21/20*** | (2006.01) |

(56) References Cited

U.S. PATENT DOCUMENTS

| | | | |
|---|---|---|---|
| 2006/0164320 | A1 | 7/2006 | Lastinger et al. |
| 2012/0055035 | A1 | 3/2012 | Litvin et al. |
| 2015/0180120 | A1 | 6/2015 | Pietraski et al. |
| 2015/0377479 | A1 | 12/2015 | Pescod et al. |

OTHER PUBLICATIONS

International Preliminary Report dated Dec. 30, 2021, from International Application No. PCT/US2019/053114, 7 pages.
Extended European Search Report, dated May 23, 2023, received in connection with corresponding EP Patent Application No. 19933789.0.

* cited by examiner ff_2D_GainTotal

| Curve Info | xdb10Beamwidth(3) | max |
|---|---|---|
| — dB(GainTotal) ATK_Solution LastAdaptive Freq='3GHz' Phi='0deg' | 76.8226 | 2.6108 |
| — dB(GainTotal) ATK_Solution LastAdaptive Freq='3GHz' Phi='90deg' | 76.1995 | 2.6018 |

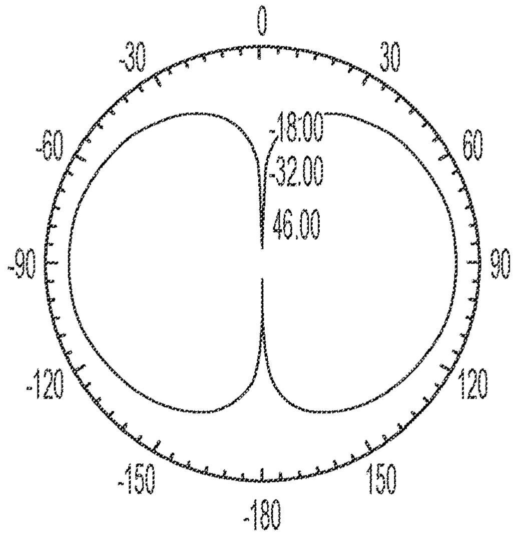

FIG. 4A ff_2D_GainTotal

| Curve Info | xdb10Beamwidth(3) | max |
|---|---|---|
| — dB(GainTotal) ATK_Solution LastAdaptive Freq='3GHz' Phi='0deg' | 27.2277 | 6.2180 |
| — dB(GainTotal) ATK_Solution LastAdaptive Freq='3GHz' Phi='90 deg' | 27.1938 | 6.3618 |

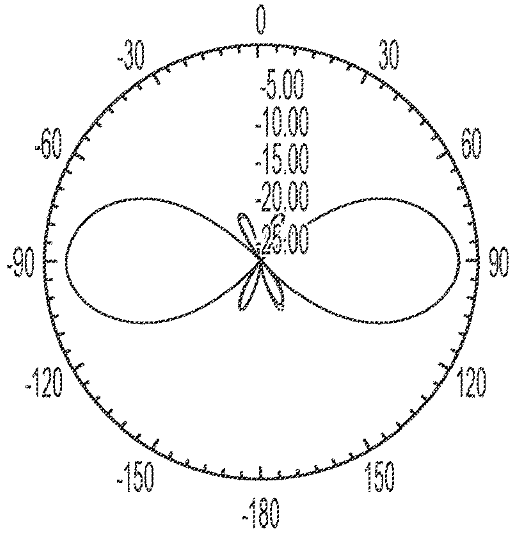

FIG. 4B ff_2D_GainTotal

| Curve Info | xdb10Beamwidth(3) | max |
|---|---|---|
| — dB(GainTotal) ATK_Solution LastAdaptive Freq='3GHz' Phi='0deg' | 17.9949 | 8.1567 |
| — dB(GainTotal) ATK_Solution LastAdaptive Freq='3GHz' Phi='90 deg' | 17.9620 | 8.1548 |

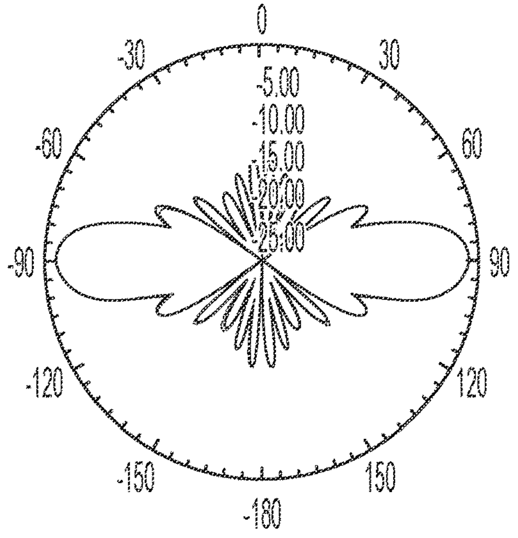

FIG. 4C

TOROIDAL GRADIENT INDEX LENS FOR OMNI AND SECTOR ANTENNAS

BACKGROUND OF THE INVENTION

Field of the Invention

The present invention relates to wireless communications, and more particularly, to omni and sector RF antennas.

Related Art

Gradient index lenses (of which a Luneburg lens is an example) are useful devices for focusing and planarizing an RF wavefront received/emitted by an antenna. A conventional Luneburg lens has a spherical shape. A deficiency in the current use of Luneburg lenses is that in order to create an antenna with omnidirectional coverage, it is necessary to place a set of radiators around the exterior of the spherical lens. This may increase the complexity and cost of the antenna. This may be especially important for small antennas intended for omnidirectional use in indoor spaces.

Conventional omnidirectional (hereinafter "omni") and quasi-omni antennas have multiple array faces, each with a plurality of radiators that are arranged in at least a vertical array, which enables control of elevation of the antenna gain pattern by differentially controlling the amplitude and phase of the different radiators along the vertical axis, conventionally known as Remote Electrical Tilt (RET). Each of these array faces require complex circuitry and many solder joints, whereby each solder joint increases the complexity of manufacture and introduces the possibility of Passive Intermodulation Distortion (PIM).

Accordingly, what is needed is a simplified omnidirectional or sector antenna that makes use of the focusing/planarizing features of a gradient index lens and has a simplified mechanism for controlling the tilt of the gain pattern.

SUMMARY

Accordingly, the present invention is directed to a toroidal gradient index lens for omni and sector antennas that obviates one or more of the problems due to limitations and disadvantages of the related art.

An aspect of the present invention involves an antenna, which comprises a toroidal gradient index lens; and a radiator disposed within a center of the toroidal gradient index lens, the radiator coincident with a toroidal z-axis.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate a toroidal gradient index lens for omni and sector antennas. Together with the description, the figures further serve to explain the principles of the toroidal gradient index lens for omni and sector antennas described herein and thereby enable a person skilled in the pertinent art to make and use the toroidal gradient index lens for omni and sector antennas.

FIG. 4A illustrates an exemplary elevation beam pattern of a dipole having no lens.

FIG. 4B illustrates an exemplary elevation beam pattern of a dipole deployed within a "canned fisheye" toroid lens configuration of FIG. 3.

FIG. 4C illustrates an exemplary elevation beam pattern of a dipole deployed within a toroidal lens of FIG. 1A/B.

DESCRIPTION OF EXEMPLARY EMBODIMENTS

Reference will now be made in detail to embodiments of the toroidal gradient index lens for omni and sector antennas according to principles described herein with reference to the accompanying figures. The same reference numbers in different drawings may identify the same or similar elements.

Figure 1A:
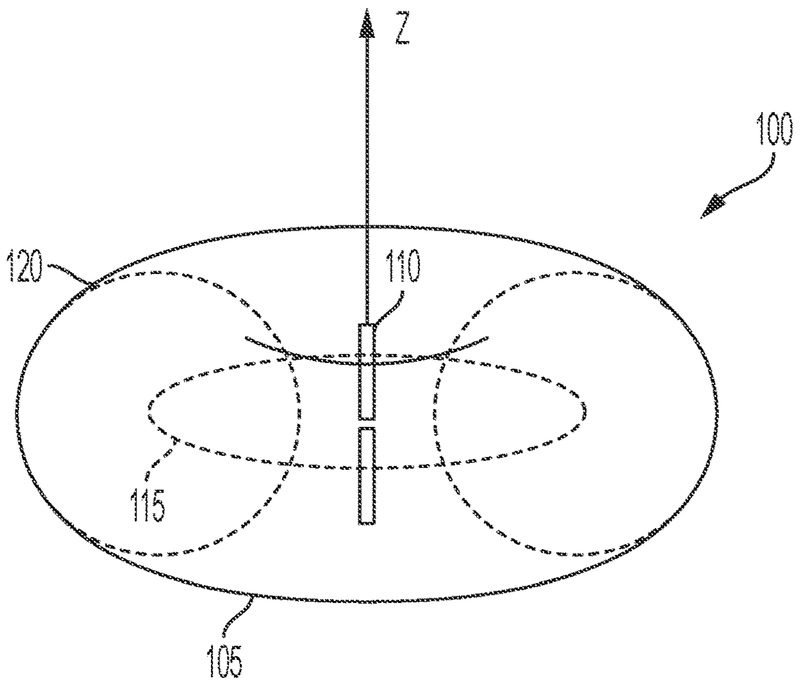
FIG. 1A illustrates an exemplary toroidal lens antenna according to the disclosure.

FIG. 1A illustrates an exemplary toroidal lens antenna 100 according to the disclosure. Toroidal lens antenna 100 includes a gradient index toroid lens 105 and a dipole 110 disposed along the toroidal center or 'z' axis. Gradient index toroid lens 105 includes a toroidal central ring 115, and an outer surface 120. The toroidal central ring 115 may simply be an axis defined by the geometry of the toroid and not a physical feature within gradient index toroid lens 105.

Gradient index toroid lens 105 has a varying index of refraction such that the refractive index is at its maximum value at the toroidal central ring 115 and decreases radially from the axis defined by the toroidal central ring such that the refractive index is at its minimum value at outer surface 120. The maximum refractive index may be uniform along toroidal central ring 110 and the minimum refractive index may be uniform at the entire outer surface 120. Generally, the refractive index gradient may be done according to the traditional Luneburg distribution:

$$n=\sqrt{2-(r/R)^2}$$

Where n is the refractive index at a given point within gradient index toroid lens 105; r is the radial distance from the toroidal central ring 115; and R is the distance from the toroidal central ring 115 to the outer surface 120.

The dielectric constant at the toroidal central ring 115 may be 2, resulting in a refractive index of sqrt(2); and the dielectric constant at the outer surface 120 may be 1, resulting in a refractive index of 1. It will be understood that variations to the specific min and max refractive indices are possible and within the scope of the invention.

Figure 1B:
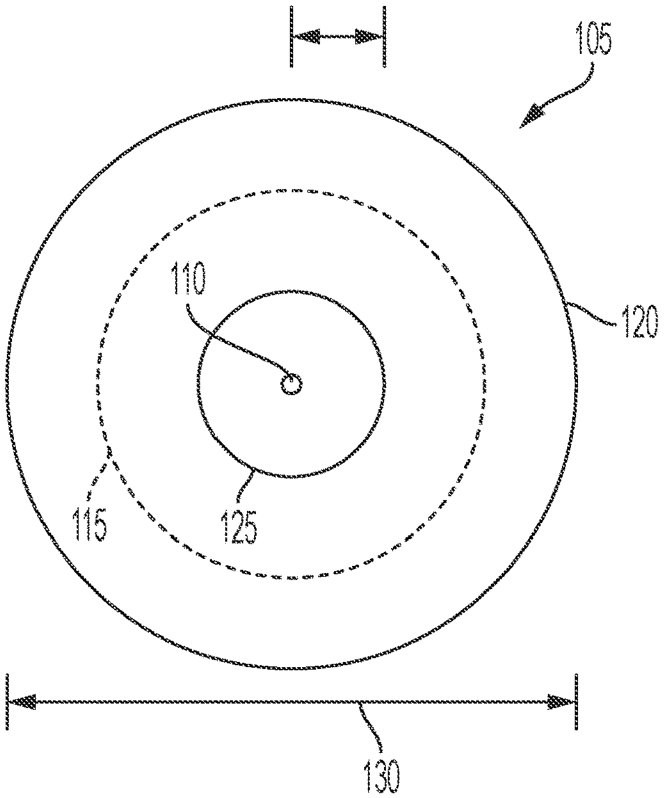
FIG. 1B illustrates the exemplary toroidal lens antenna of FIG. 1A from along the central z-axis of the toroid.

FIG. 1B illustrates toroidal lens antenna 100 from along the z-axis. Illustrated is dipole 110, concentric to the z-axis; and gradient index toroid lens 105, which includes toroidal central ring 115 an inner diameter 125, and an outer diameter 130. Generally, the inner diameter 125 may be close enough to be in substantial contact with dipole 110. As used herein, substantial contact means that a gap may be present between the inner diameter and the dipole 110 to allow the dipole 110 to translate along the z-axis.

Figure 2:
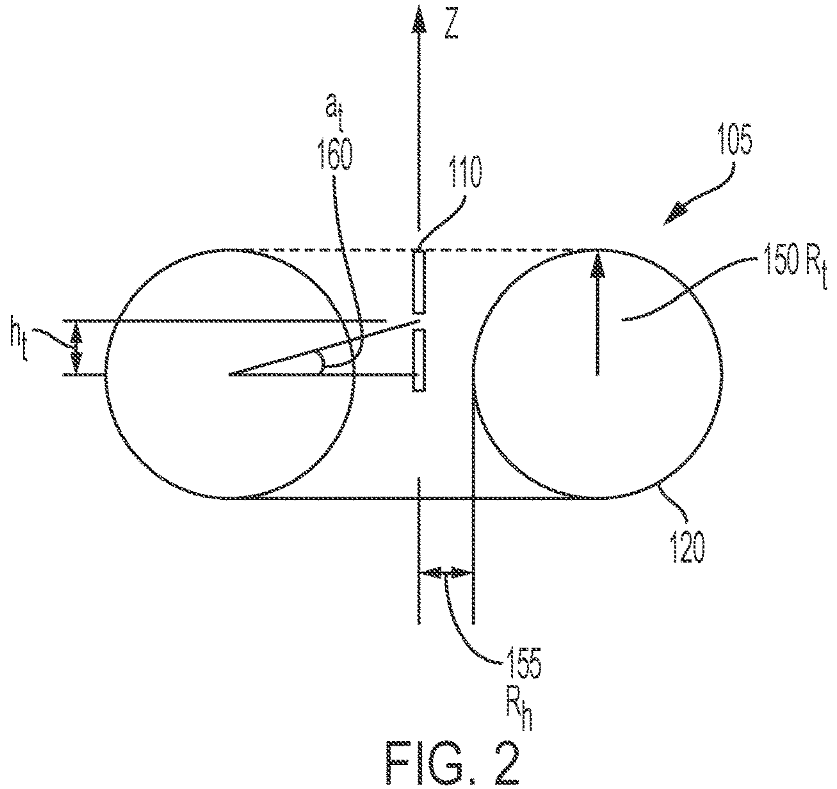
FIG. 2 illustrates the exemplary toroidal lens of FIGS. 1A/B with the dipole translated vertically upward to tilt the antenna gain pattern downward.

FIG. 2 illustrates toroidal lens antenna 100 with dipole 110 translated vertically along the z-axis, which causes the antenna gain pattern to tilt in the opposite direction. In other words, an upward translation of dipole 110 tilts the gain pattern downward. Relevant dimensions of gradient index toroid lens 105 include a toroid element thickness radius $R_t$ 150, and an inner hole radius $R_h$ 155. Further relevant dimensions for achieving tilt include antenna translation height $h_t$ and downward tilt angle $a_t$ 160. This is discussed in further detail below.

Figure 3:
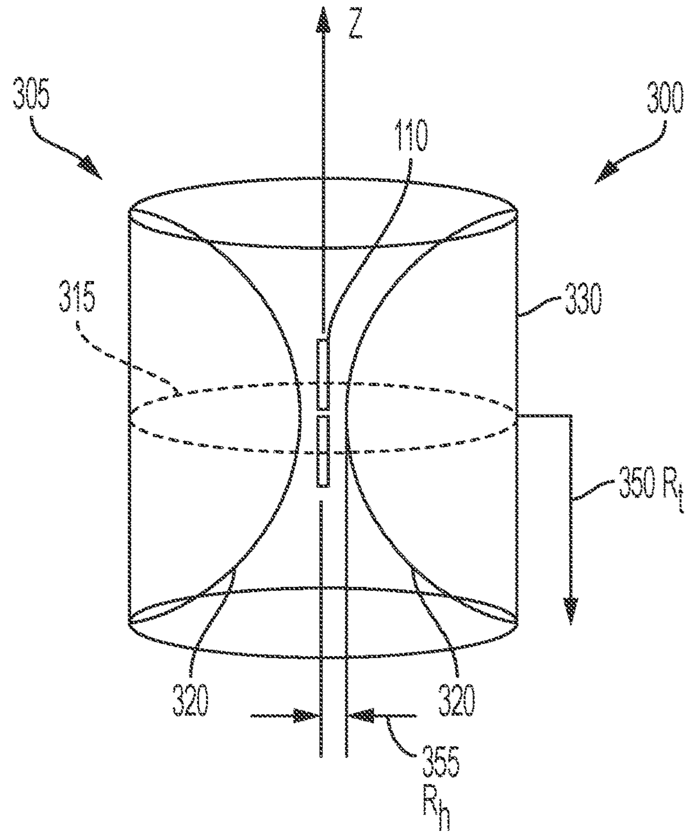
FIG. 3 illustrates an exemplary cylindrical toroidal lens antenna having a "canned fisheye" toroid lens configuration according to the disclosure.

FIG. 3 illustrates an exemplary cylindrical toroidal lens antenna 300 having a "canned fisheye" toroid lens configuration according to the disclosure. Cylindrical toroidal lens antenna 300 has a dipole 110 disposed within a cylindrical toroidal lens 305, which has a cylindrical outer surface 330 and an inner surface 320, wherein the inner surface 320 may be the same as the outer surface 130 of gradient index toroid lens 105 except that inner surface 320 terminates where it meets cylindrical outer surface 330. Cylindrical toroidal lens 305 may be substantially similar to gradient index toroid lens 105 but with the portion of the toroid beyond the toroidal central ring 115 removed, forming a cylindrical shape with a circumference coincident with the toroidal central ring 115. Accordingly, cylindrical toroidal lens 305 may be identical to the inner portion of gradient index toroid lens 105 inward of the toroidal central ring 115. For cylindrical toroidal lens 305, perimeter axial ring 315 defines where the refractive index is at its maximum, similar to how the toroidal central ring 115 defines where the refractive index is at its maximum for gradient index toroid lens 105. The refractive index at any given point within cylindrical toroid lens 305 may be defined in accordance with the Maxwell Fisheye Lens distribution as:

$$n=\sqrt{\frac{4}{\left(1+(r/R_t)^2\right)}}$$

Where n is the refractive index at a given point within cylindrical toroid lens 305; r is the radial distance from the perimeter axial ring 315 to the given point within cylindrical toroid lens 305; and $R_t$ is the toroid element thickness radius 350, or the distance from the perimeter axial ring 315 to inner surface 320.

The dielectric constant at the perimeter axial ring 315 may be 4, resulting in a refractive index of 2; and the dielectric constant at the inner surface 320 may be 2, resulting in a refractive index of sqrt(2). It will be understood that variations to the specific min and max refractive indices are possible and within the scope of the invention Although FIGS. 1A, 1B, 2 and 3, as illustrated, show a distance between the inner hole radius 155/355 and dipole 110, this is for illustration purposes. It will be understood that inner hole radius 155/355 may be such that dipole 110 may be close enough to be in substantial contact with the inner diameter, and that the longer the wavelength, the further this distance can be without significantly degrading performance. As used herein, substantial contact means that a gap may be present between the inner diameter and the dipole 110 to allow the dipole 110 to translate along the z-axis, and the permissible length of this gap depends on the frequency in which toroidal lens antenna 100 operates.

The dimensions of gradient index toroid lens 105 or cylindrical toroid lens 305 (toroid element thickness radius 150/350) may be selected based on the desired elevation beam of antenna 100/300. In generally, if the inner hole radius 155/355 is kept constant, the greater the toroid element thickness radius 150/350, the narrower the elevation beamwidth.

FIG. 4A illustrates an elevation beam pattern of dipole 110 having no lens; FIG. 4B illustrates an elevation beam pattern of antenna 300, which includes dipole 110 with cylindrical toroid lens 305; and FIG. 4C illustrates an elevation beam pattern of antenna 100, which includes dipole 110 with gradient index toroid lens 105.

Figure 5A:
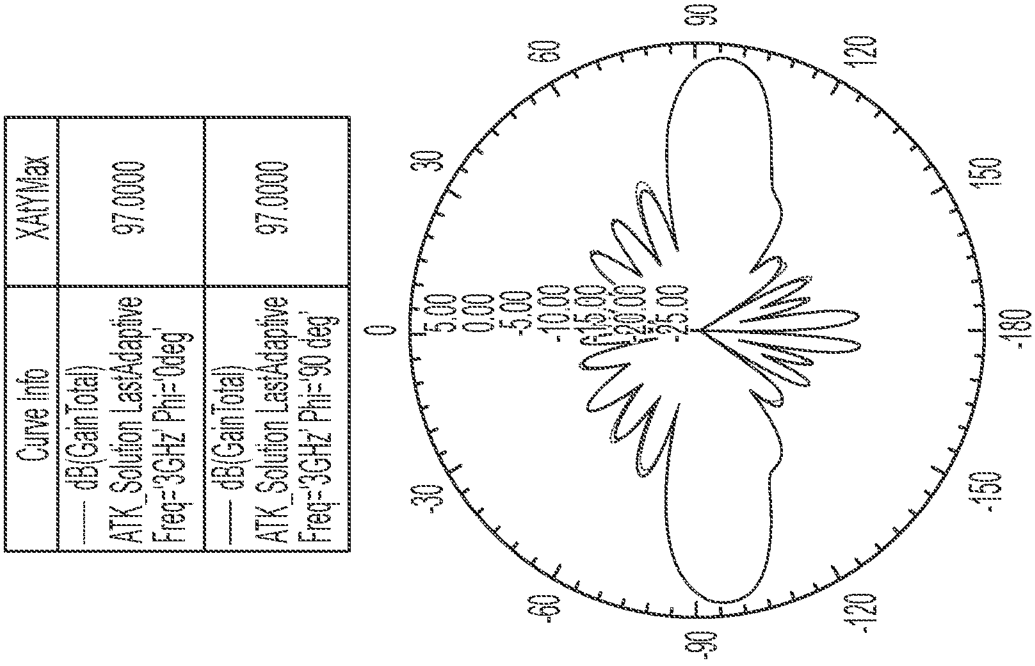
FIG. 5A illustrates an exemplary elevation beam pattern of a dipole deployed with a toroidal lens of FIG. 1A/B with the dipole translated along the z-axis as illustrated in FIG. 2, thereby tilting the beam downward by approximately 6 degrees.

FIG. 5A illustrates an exemplary elevation beam pattern for antenna 100 in which dipole 110 is translated "upward" along the z-axis by a distance of 0.736", thereby imparting a downward tilt of approximately 6 degrees. In this example, inner hole radius 155 is 1" and toroid element thickness radius 150 is 6". The pattern shown is with an excitation at 3 GHz.

Figure 5B:
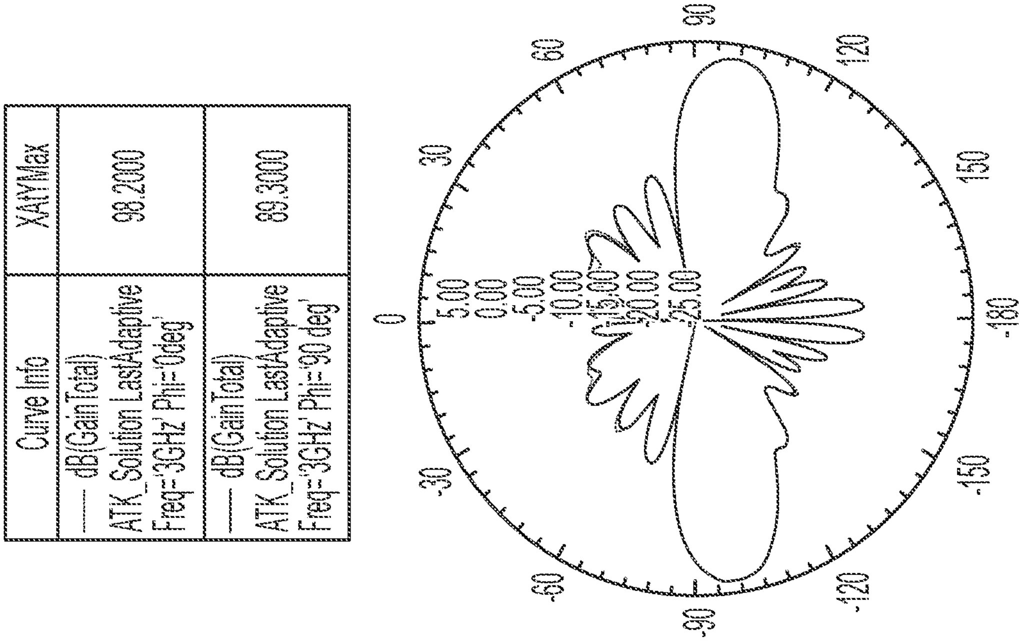
FIG. 5B illustrates an exemplary elevation beam pattern of a dipole deployed with a toroidal lens of FIG. 1A/B with the dipole translated along the z-axis as illustrated in FIG. 2, thereby tilting the beam downward by approximately 9 degrees

FIG. 5B illustrates an exemplary elevation beam pattern for antenna 100 in which dipole 110 is translated "upward" along the z-axis by a distance of 1.109", thereby imparting a downward tilt of approximately 9 degrees. In this example, inner hole radius 155 is 1" and toroid element thickness radius 150 is 6", same as for FIG. 5A. The pattern shown is with an excitation at 3 GHz.

Figure 6B:
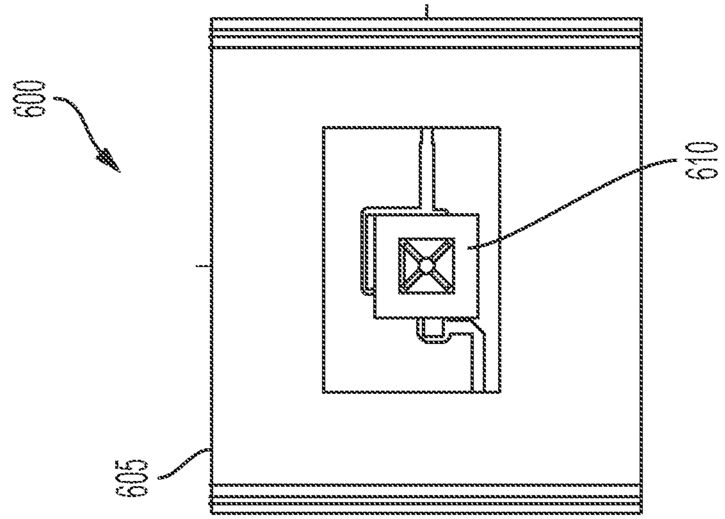
FIG. 6B illustrates an exemplary tri-sector core radiator configuration, from a side view.
Figure 6A:
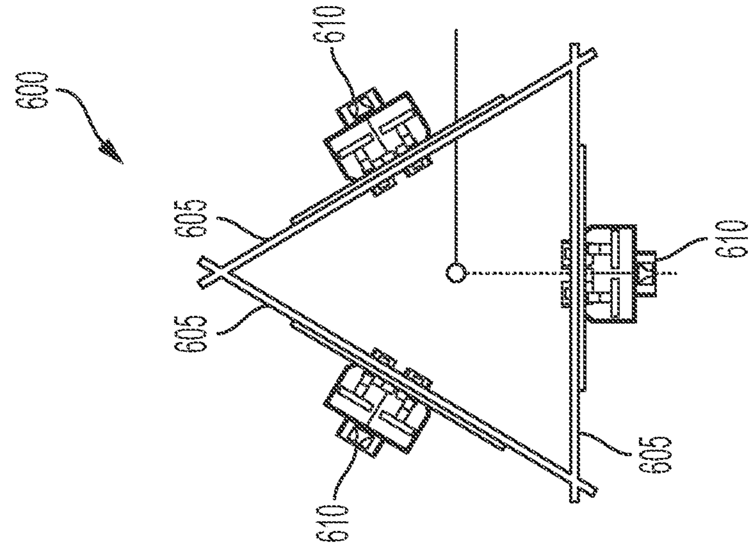
FIG. 6A illustrates an exemplary tri-sector core radiator configuration, from a "top down" perspective.

FIG. 6A illustrates an exemplary tri-sector core radiator 600 from a "top down" perspective. The tri-sector core radiator 600 may be used in place of dipole 110 in of the configurations described herein. Tri-sector core radiator 600 includes three faceplates 605 arranged in a triangular configuration, with a radiator 610 disposed on each of the three faceplates 605. The three faceplate 605 and radiator 610 combinations may be identical. They may be fed separately to form three distinct sectors, or they may be fed with a single RF source to form a quasi-omni antenna. It will be understood that such variations are possible and within the scope of the invention. FIG. 6B is a side view of one of the faceplate 605 and radiator 610 pairs.

Figure 7A:
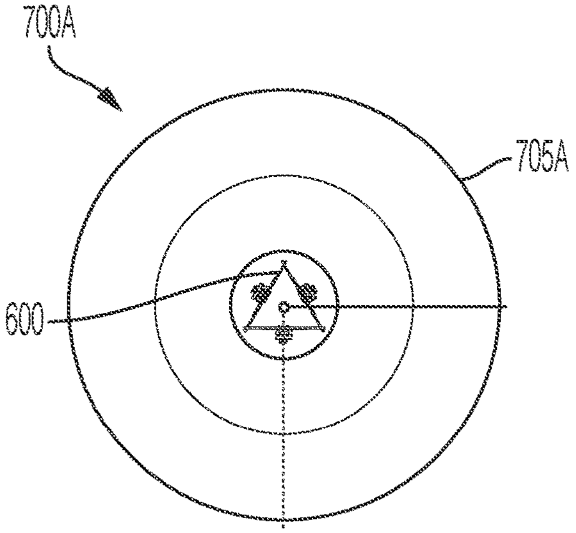
FIG. 7A illustrates an exemplary tri-sector toroidal lens antenna according to the invention, having a first toroid element thickness radius.
Figure 7B:
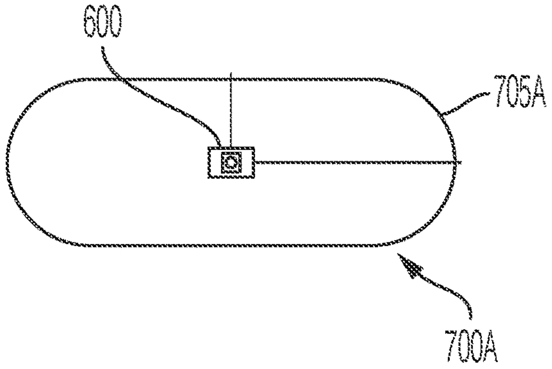
FIG. 7B illustrates an exemplary tri-sector toroidal lens antenna of FIG. 7A, from a side view perspective.

FIG. 7A illustrates an exemplary tri-sector toroidal lens antenna 700A according to the principles described herein. Antenna 700A has a gradient index toroid lens 705A having a first toroid element thickness radius of 3" and an inner hole radius 155 of 2". Tri-sector core antenna 600 is shown disposed within the inner hole of gradient index toroid lens 705A. FIG. 7B is a side view of antenna 700A.

Figure 7C:
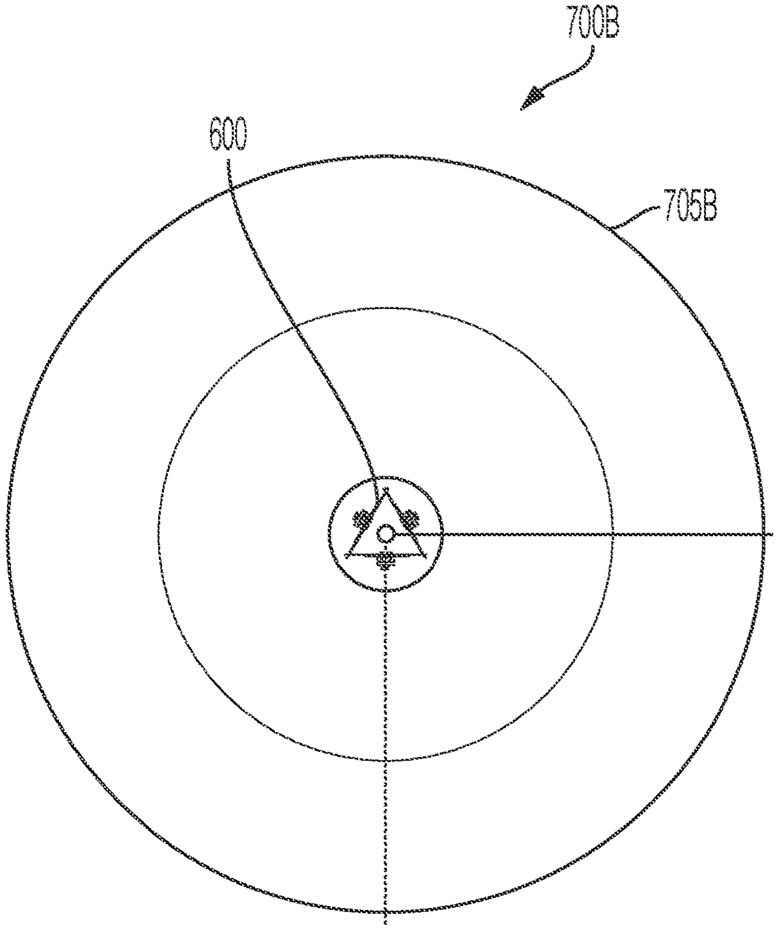
FIG. 7C illustrates an exemplary tri-sector toroidal lens antenna according to the invention, having a second toroid element thickness radius that is greater than the first toroid element thickness radius.

FIG. 7C illustrates an exemplary tri-sector toroidal lens antenna 700B according to the principles described herein. Antenna 700B has a gradient index toroid lens 705B having a first toroid element thickness radius of 6" and an inner hole radius 155 of 2". Tri-sector core antenna 600 is shown disposed within the inner hole of gradient index toroid lens 705B.

Figure 8C:
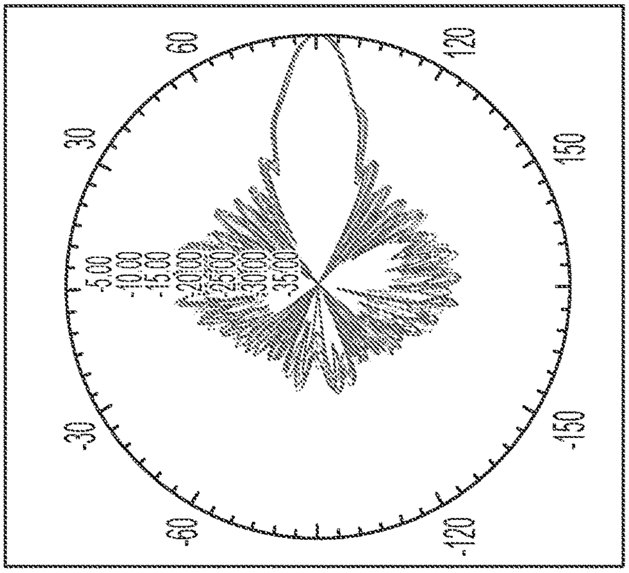
FIG. 8C illustrates an exemplary elevation beam pattern corresponding to the exemplary tri-sector toroidal lens antenna of FIG. 7C, having a second toroid element thickness radius, showing one of the three sectors.
Figure 8B:
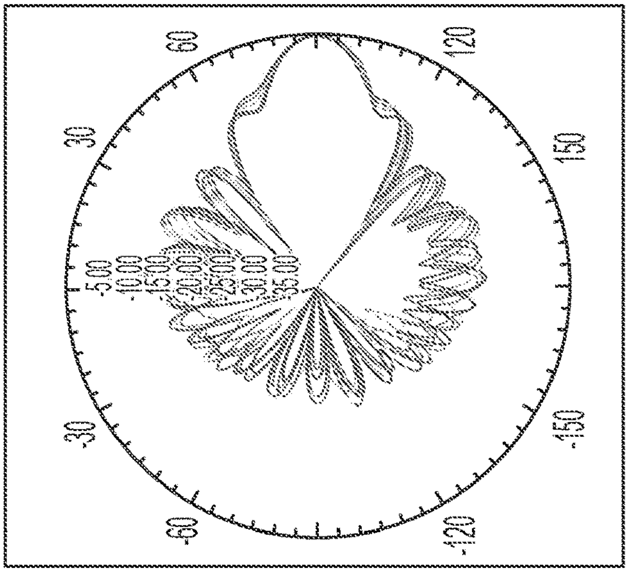
FIG. 8B illustrates an exemplary elevation beam pattern corresponding to the exemplary tri-sector toroidal lens antenna of FIG. 7A, having a first toroid element thickness radius, showing one of the three sectors.
Figure 8A:
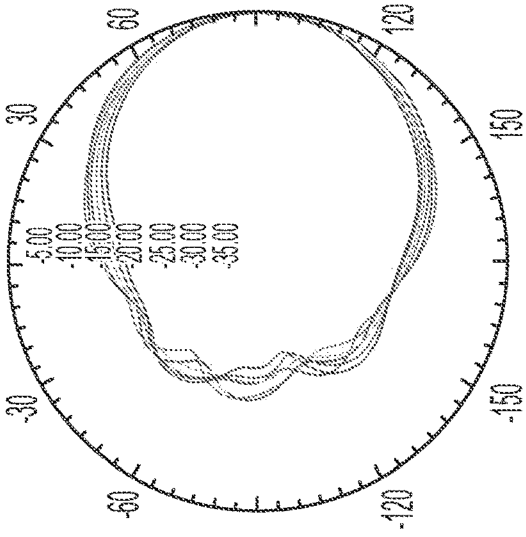
FIG. 8A illustrates an exemplary elevation beam pattern corresponding to the exemplary tri-sector core radiator (with no lens) of FIG. 6A, showing the gain pattern of one of the three sectors.

FIG. 8A illustrates an exemplary elevation beam pattern for a plurality of frequencies of one sector of tri-sector core antenna 600, radiating at 5.15, 5.25, 5.35, 5.55, 5.75, and 5.925 GHz, with no lens. FIG. 8B illustrates an exemplary elevation beam pattern of antenna 700A, at the same frequencies, which includes tri-sector core antenna 600 (just one sector activated) and gradient index toroid lens 705A which has a first toroid element thickness radius of 3"; and FIG. 8C illustrates an exemplary elevation beam pattern of antenna 700B, at the same frequencies, which includes tri-sector core antenna 600 (just one sector activated) and gradient index toroid lens 705B, which has a second toroid element thickness radius of 6". It will be readily apparent that there is considerable directed gain improvement along the zero azimuth and elevation of the gain pattern, brought about by the presence of gradient index toroid lenses of increasing toroid element thickness radius.

Figure 8D:
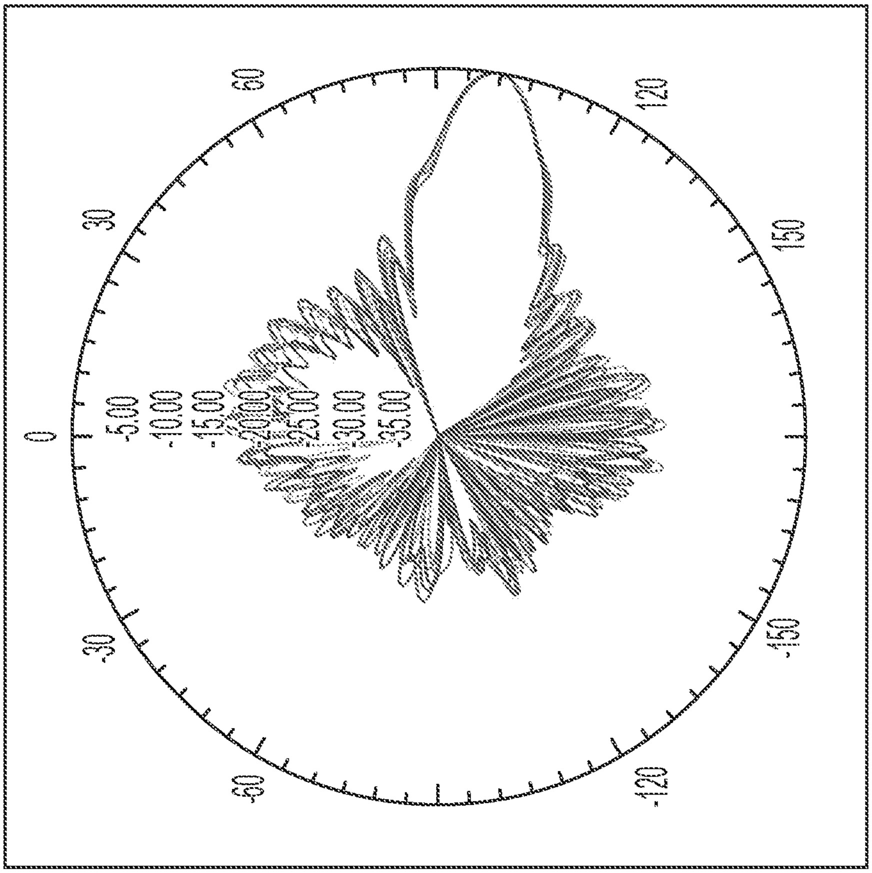
FIG. 8D illustrates an exemplary elevation beam pattern corresponding to the exemplary tri-sector toroidal lens antenna of FIG. 7C, having a second toroid element thickness radius, in which the tri-sector core radiator is translated along the z-axis, thereby imparting a downward tilt in the elevation gain pattern, showing one of the three sectors.

FIG. 8D illustrates an exemplary elevation beam pattern corresponding to the exemplary tri-sector toroidal lens antenna 700B (FIG. 7C), having a second toroid element thickness radius of 6", in which the tri-sector core radiator 600 is translated along the z-axis by a distance of 1.109", thereby imparting a downward tilt of about 9 degrees in the elevation gain pattern. The gain pattern of one of the sectors is shown.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. An antenna, comprising:
- a toroidal gradient index lens; and
- a radiator disposed within a center of the toroidal gradient index lens, the radiator coincident with a toroidal z-axis, wherein the radiator is configured to translate along the toroidal z-axis.

2. The antenna of claim 1, wherein the radiator comprises a dipole.

3. The antenna of claim 1, wherein the radiator comprises a multi-sector radiator.

4. The antenna of claim 3, wherein the multi-sector radiator comprises a tri-sector radiator.

5. The antenna of claim 2, wherein the toroidal gradient index lens comprises an inner diameter such that the toroidal gradient index lens is in substantial contact with the dipole.

6. The antenna of claim 1, wherein the toroidal gradient index lens comprises:
- a toroidal central ring region corresponding to a maximum refractive index; and
- an outer surface corresponding to a minimum refractive index.

7. The antenna of claim 1, wherein the toroidal gradient index lens comprises a cylindrical outer surface.

8. The antenna of claim 7, wherein the toroidal gradient index lens comprises:
- a perimeter axial ring region corresponding to a maximum refractive index; and
- an inner surface corresponding to a minimum refractive index.

9. The antenna of claim 1, wherein the radiator is in substantial contact with an inner diameter of the toroidal gradient index lens.

10. The antenna of claim 1, wherein translation of the radiator in a first direction along the toroidal z-axis is configured to tilt a gain pattern of the antenna in a second direction along the toroidal z-axis, the second direction being opposite to the first direction.

* * * * *